(12) United States Patent
Goebel

(10) Patent No.: US 7,223,094 B2
(45) Date of Patent: May 29, 2007

(54) BLOWER FOR COMBUSTION AIR

(75) Inventor: Peter Goebel, Frankenberg (DE)

(73) Assignee: Emb-Papst Landshut GmbH, Landshut (DE)

( * ) Notice: Subject to any disclaimer, the term of this patent is extended or adjusted under 35 U.S.C. 154(b) by 0 days.

(21) Appl. No.: 11/155,350

(22) Filed: Jun. 17, 2005

(65) Prior Publication Data

US 2005/0255418 A1    Nov. 17, 2005

Related U.S. Application Data

(63) Continuation of application No. 10/472,660, filed as application No. PCT/EP02/03253 on Mar. 22, 2002, now Pat. No. 6,939,127.

(30) Foreign Application Priority Data

Mar. 23, 2001   (DE) ................................. 101 14 405
Mar. 26, 2001   (DE) ................................. 101 14 901

(51) Int. Cl.
  *F23N 3/00*   (2006.01)
  *F23N 5/18*   (2006.01)
(52) U.S. Cl. ........................... 431/12; 431/18; 110/186

(58) Field of Classification Search ................. 431/12, 431/18; 374/37; 110/185, 186, 188; 60/726; 417/423.1
See application file for complete search history.

(56) References Cited

U.S. PATENT DOCUMENTS

| 4,359,284 A | 11/1982 | Kude et al. |
| 5,401,162 A | 3/1995 | Bonne |
| 5,486,107 A | 1/1996 | Bonne |
| 6,752,621 B2 | 6/2004 | Rusche et al. |

FOREIGN PATENT DOCUMENTS

| EP | 0 075 369 A1 | 3/1983 |
| EP | 1 002 997 A2 | 5/2000 |

*Primary Examiner*—Alfred Basichas
(74) *Attorney, Agent, or Firm*—Rankin, Hill, Porter & Clark LLP

(57) ABSTRACT

A blower for combustion air in a wall/floor furnace is provided that includes a blower housing (26), and blower wheel (27), with an air inlet (28) and an air outlet (29), and with a fuel feeder line (1) for fuel, wherein a mass current sensor (13) for determining the air mass current is located on the air inlet (28), which is functionally connected with a data processing device (4) and sends signals to the data processing device for calculation of a ratio of combustion medium to combustion air in dependence on a desired heating capacity.

15 Claims, 3 Drawing Sheets

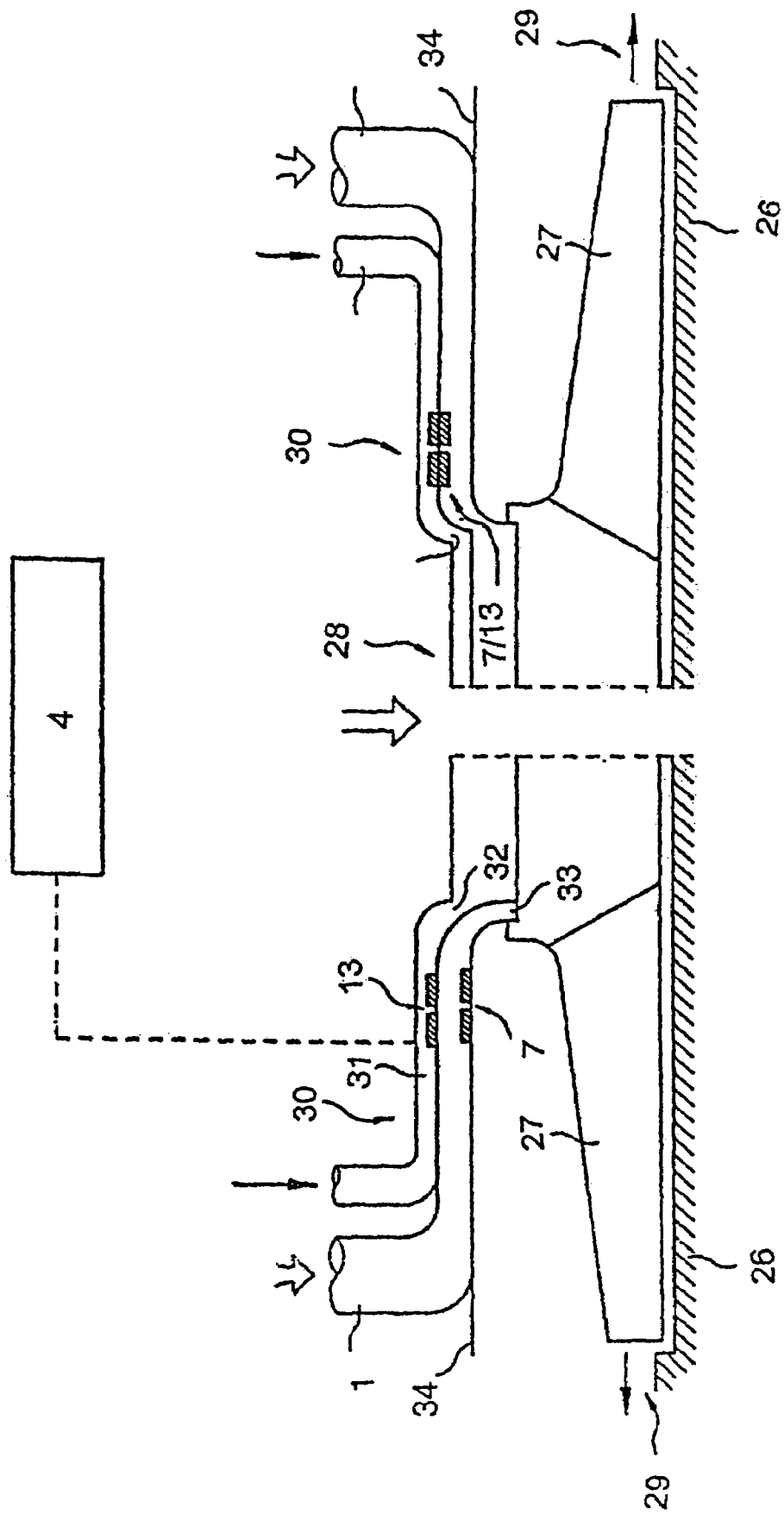

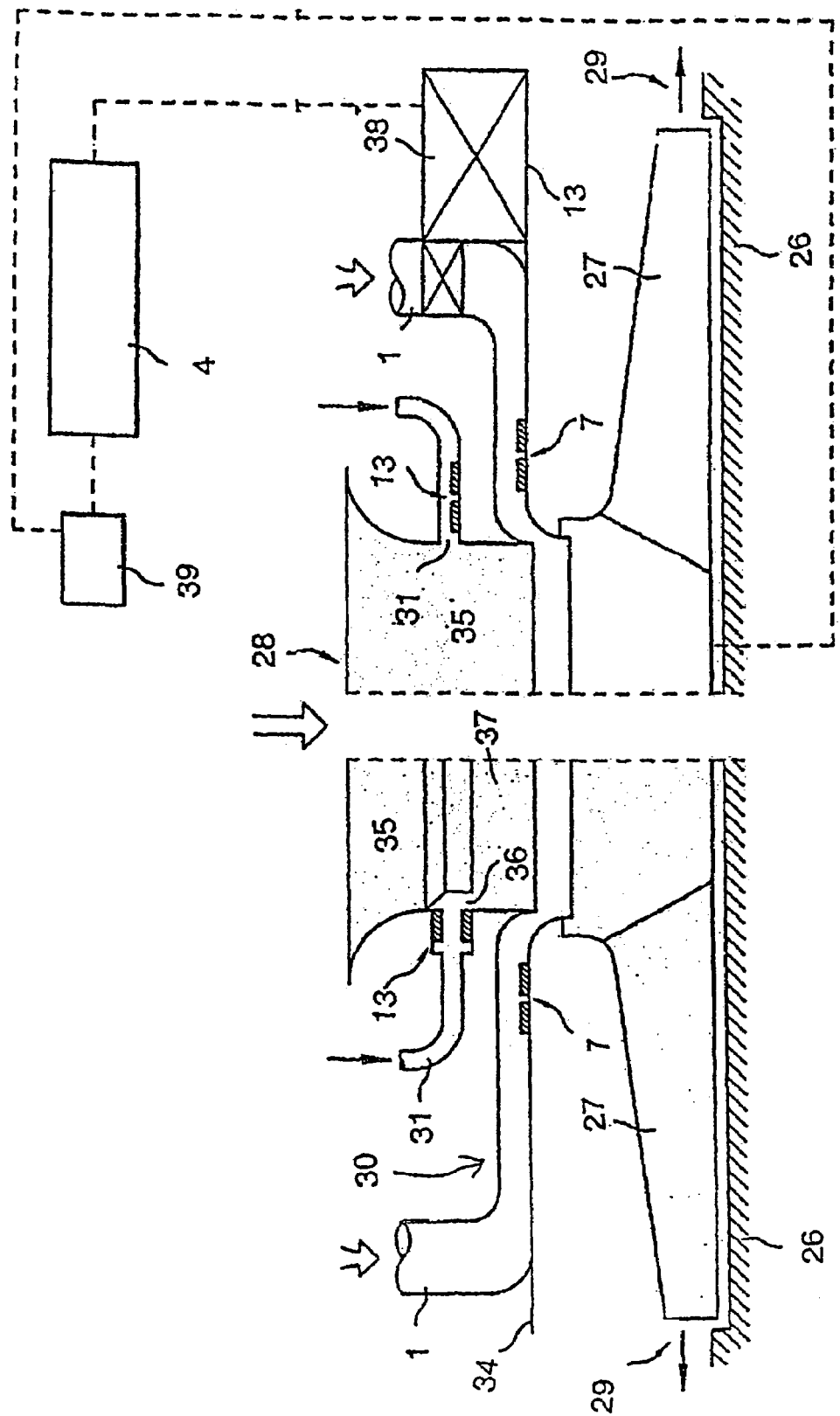

BLOWER FOR COMBUSTION AIR

CROSS REFERENCE TO RELATED APPLICATIONS

This application is a continuation of U.S. patent application Ser. No. 10/472,660 filed on Sep. 22, 2003 now U.S. Pat. No. 6,939,127 which is currently pending and is a national stage filing of International Application PCT/EP02/03253 filed on Mar. 22, 2002 claiming priority to German patent application 101 12 405.9 filed on Mar. 23, 2001 and German patent application 101 14 901.8 filed on Mar. 26, 2001. The entirety of the disclosure of U.S. patent application Ser. No. 10/472,660 is incorporated herein.

BACKGROUND OF THE INVENTION

The invention relates to a blower for combustion air.

From DE 29 28 739 B1 a method is known during which a partial current from a combustible gas is taken and is guided over a laminar resistance. The drop in pressure over the laminar resistance is measured at constant temperature or with suitable temperature compensation. The measured pressure drop or the viscosity of the gas can be used to determine the Wobbe index or the Wobbe number and therefore the calorific value as well as useful heat of the gas.

From WO 2000/065280 or DE 199 18 901 C1 a device is known for setting of the oxidising agent/fuel mixture in the feeder line of a burner. The viscosity of the oxidising agent/fuel mixture is measured and, depending on the determined measured value, the composition of the oxidising agent/fuel mixture is set. To measure the viscosity, the volume current, the temperature and the pressure of the fuel, among others, are measured. With the suggested method, determination of the viscosity is dependent on many parameters. Due to measuring errors when the individual parameters are measured, determination of the viscosity is sometimes inaccurate. Due to this, the setting of the oxidising agent/fuel mixture is not always optimal.

From DE 43 36 174 it is known that a volume current of a fuel gas is measured for measurement and/or regulation of the amount of heat to be fed to gas-consuming devices. In addition, the speed of sound and the density of the gas are measured under normal conditions as well as the speed of sound under operating conditions. The amount of heat to be fed to the gas-consuming device is determined from the aforementioned parameters.

The pressure fluctuations carried in from the gas network cannot be determined by the known device. A pressure regulator must be installed in front. The known device is not particularly universal since it only optimises the gas/air mixture to a specified value. In particular, it is not specially considered that a burner must sometimes be operated with different gas/air mixtures depending on selection of a specified operating mode.

BRIEF SUMMARY OF THE INVENTION

The object of the invention is to specify a universal method and a universal device for the setting of the air ratio of a fuel/air mixture.

According to the invention, a blower with a blower housing and a blower wheel can be provided for air or combustion air in a wall/floor furnace which has an air inlet (suction side) and an air outlet (pressure side) and which is equipped with the fuel feeder line for a preferably gaseous fuel, wherein a mass current sensor is located on the air inlet as part of the air feeder line, and is functionally connected to the data processing device and this sensor sends signals to this for the conditioning of the ratio of combustion medium/combustion air in dependence on the desired heating capacity.

A device with such a blower is made available which provides and permanently ensures homogenous low-emission combustion to a full mixing surface burner through the acquisition of the air and gas mass current. By combining the blower with a fuel feeder line for the fuel or the gaseous combustion medium, a compact construction unit is provided which significantly reduces installation work when the furnace is manufactured. By acquiring the mass current of the combustion air and the mass current of the combustion medium directly on the air inlet, one obtains the required actual values for control and regulation without interference so that the regulation of the mixture ratio permits a precise setting and low-emission combustion is provided.

This is particularly an advantage when the mass current sensor is an electronic air mass current anemometer. Such an anemometer has proven useful for various measuring areas and supplies sufficiently precise signals for the determination of the mass current of a gaseous medium.

A particularly optimized arrangement is a ring jet arrangement on the air inlet of the blower on which the mass current sensor is located. This special arrangement for the site of the mass current sensor permits interference-free acquisition of the mass current since there is a pseudo laminar current flow at this location and the measured states can be considered homogeneous over the cross section area on the suction side.

It is particularly advantageous when the mass current sensor is located in a bypass which empties into the gap of the ring jet arrangement. An optimal measuring mass current is fed by this to the mass current sensor so that the applicable measuring signals result in an error-free determination of the actual mass current in the main current.

With a further embodiment, the ring jet arrangement also has an additional jet gap for the provision of fuel in addition to the jet gap for the air mass measurement. This special formation permits a very homogeneous mixture of the fuel with the combustion air.

It may be favourable that a further mass current sensor is installed in the area of the additional jet gap which sends appropriate signals to the data processing device. This makes it possible to achieve optimal combustion conditions regardless of the fixed values set on the device for the combustion gas.

It can also be an advantage that the ring jet arrangement is an integral part of the housing wall on the air inlet of the blower. It is favourable that the ring jet arrangement surrounds or forms a ring around the main current of the combustion air on the air inlet. This arrangement ensures continuous homogeneous suctioning of the measuring air current through the applicable jet gap.

With a different design form, it may be favourable that an input canal is placed in front of the ring jet arrangement. The bypass can empty into the input canal when a favourable formation is used. However, the bypass can also empty into a ring gap inside the input canal so that a uniform suctioning of the measuring air current is ensured in accordance with the pressure distribution over the cross section.

With an additional design form, it may be favourable that the gas feeder is controlled via a rotary valve/regulator valve that is an integral part of the blower housing. It is advantageous that this rotary valve/regulator valve is designed for the gas feeder on the suction side of the blower. This makes manufacturing efficient.

The formation provided by the invention advantageously lets the electronic motor commutation handle the mass current evaluation and regulate the speed of the blower motor based on the results of the evaluation.

It is particularly advantageous when the electronic motor commutation handles the mass current evaluation and regulates both the speed of the blower motor and the gas feeder.

Examples will now be used to describe the invention in more detail based on the drawings.

BRIEF DESCRIPTION OF THE FIGURES

FIG. 1 A schematic sectional presentation of a first blower,

FIG. 2 A schematic sectional presentation of a second blower,

FIG. 3 A schematic sectional presentation of a third blower,

FIG. 4 A schematic sectional presentation of a fourth blower, and

DETAILED DESCRIPTION OF THE INVENTION

Figure 5:
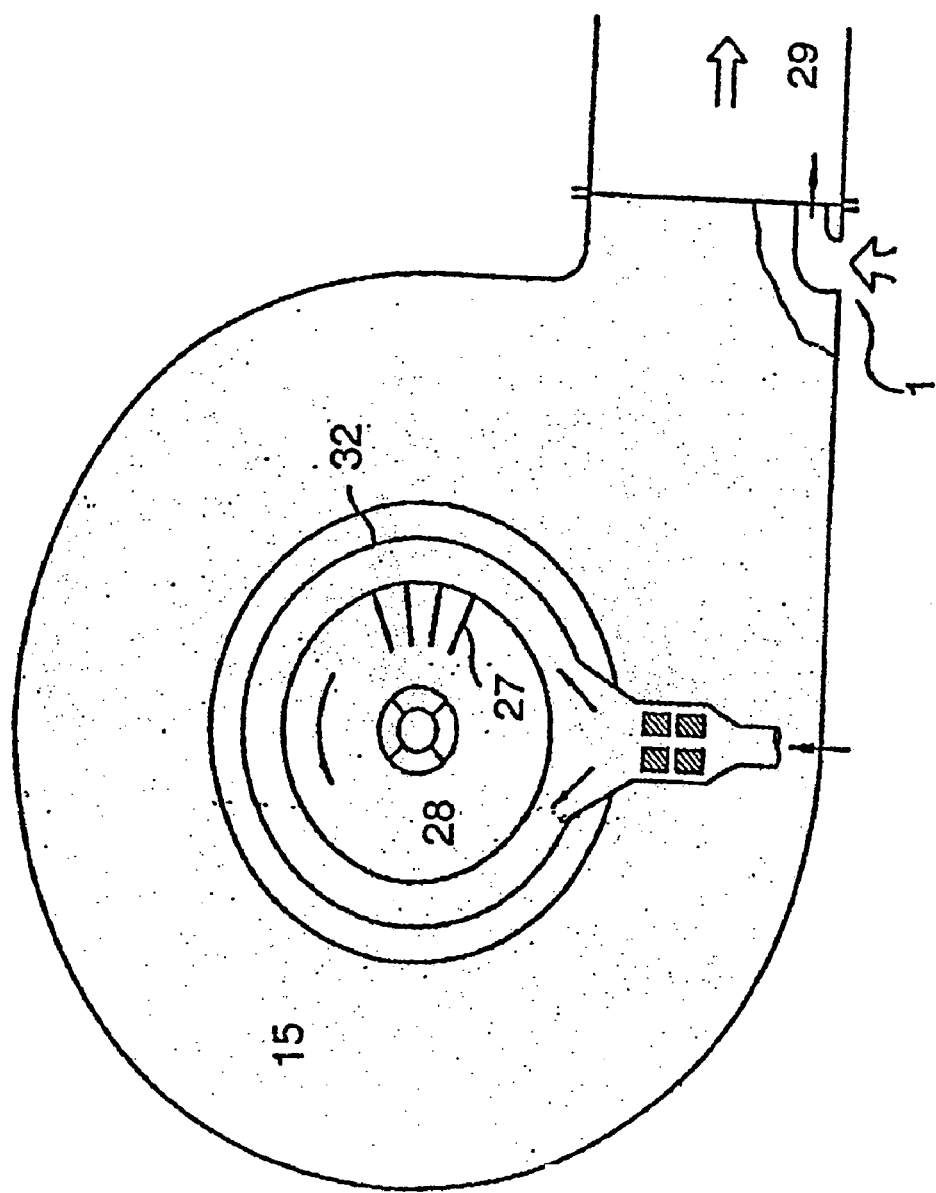
FIG. 5 A schematic view of the top of a blower with a gas feeder on the air outlet.

FIG. 1 shows an example of a blower for combustion air as it is used in so-called wall/floor furnaces. The blower is composed of a fan housing 26 and a fan wheel 27 with an air inlet 28 and an air outlet 29. The air inlet 28 is the suction side of the blower while the air outlet 29 is the pressure side. In the example of the invention shown in FIG. 1, the gas feeder line is again labeled with the reference designation 1. The mass current sensor 13 which is used to determine the air mass current is located on air input 28. The mass current sensor 13 sends signals to a controller-regulator unit or data processing device 4 which controls the combustion, e.g., sets the relationship between combustion medium and combustion air in dependence on the desired heating capacity. The mass current sensor 13 can be an electronic air mass current anemometer as can be procured through conventional sources.

A ring jet arrangement 30 is located on air inlet 28 wherein the mass current sensor 13 is mounted to this ring jet arrangement 30. The mass current sensor 13 is located in a bypass 31 which opens in the jet gap 32 of the ring jet arrangement 30.

As shown in the example, the ring jet arrangement 30 has a further jet gap 33 (gas jet gap) to feed in the gas in addition to jet gap 32 for air mass measurement.

A further mass current sensor 7 is located in a further jet gap 33 which sends signals to the data processing device 4 with respect to the mass current of the combustion gas.

The data processing device 4 uses the signals of the air mass current and those of the gas mass current to calculate the appropriate variables to achieve the respective desired values if these deviate from the actual values.

The ring jet arrangement 30 is an integral part of a housing wall 34 of the blower. The housing wall 34 can be part of the ring jet for the combustion gas. The ring jet arrangement 30 surrounds the main current of the combustion air in the shape of a ring on air inlet 28. A homogenous mixture of combustion gas and main air current is achieved by this.

While the mass current sensors 7, 13 are installed in separate components in the applicable lines or ring jet sections as shown in the example in FIG. 1, the mass current sensors 7, 13 shown in the example in FIG. 2 are designed so that there is a common separating wall between the ring jet for the air mass measuring current and the gas current created by a measuring chip. This creates a compact unit.

FIG. 3 shows a further example of a blower. An input canal 35 is located in front of the ring jet arrangement 30. With this formation, the second mass current sensor 13 for the air mass current is located in bypass 31 which empties into input canal 35. Inside input canal 35 is a covered ring canal 37 in front of a ring gap 36 into which canal the bypass 31 empties. The ring-shaped suctioning achieves a homogenous suction of the mass current measuring volume through bypass 31.

In the example shown in FIG. 4, bypass 31 is designed so that its opening is primarily pointing vertically to the wall of input canal 35.

FIG. 4 shows an example of a rotary valve/regulator valve 38 as can be used for all other versions and which is activated by data processing unit 4. The rotary valve/regulator valve 38 is an integral part of the blower. With the formation shown, the rotary valve/regulator valve 38 is designed for the gas feed-in on the suction side of the blower.

As an example for all other versions, FIG. 4 shows the motor 39 of the blower, wherein the data processing device 4 handles the mass current evaluation together with the electronic motor commutation and the speed of the blower motor can be regulated by this. The control electronics are designed so that either the gas feed-in is regulated at constant speed of the motor 39 or both the speed of the motor and the gas feed-in can be regulated appropriately with a continuous set-point/actual value comparison of the desired capacity.

FIG. 5 shows a side view of a formation provided by the invention in which the gas feed-in 1 does not take place via a ring jet on the air inlet but in the vicinity of the pressure side on the air outlet.

The invention is not restricted to the aforementioned preferable examples. Instead a number of versions is conceivable which can make use of the presented solutions even if the models are fundamentally different.

REFERENCE DESIGNATION LIST

1 Gas feeder line
4 Data processing device
7 Further mass current sensor
13 Mass current sensor
26 Fan housing
27 Fan wheel
28 Air inlet
29 Air outlet
30 Ring jet arrangement
31 Bypass
32 Jet gap
33 Further jet gap
34 Housing wall
35 Input canal
36 Ring gap
37 Ring canal
38 Rotary valve/regulator valve
39 Motor

What is claimed is:

1. A blower for a mixture of combustion air and fuel in a wall/floor furnace, comprising a blower housing (26), and a blower wheel (27), with an air inlet (28) and an air outlet (29), and with a fuel feeder line (1) for the fuel, wherein a mass current sensor (13) for determining the air mass current is located on the air inlet (28), said mass current sensor being functionally connected with a data processing device (4) and supplying signals to said data processing device for calculation of a ratio of fuel to combustion air in dependence on a desired heating capacity, wherein the mass current sensor (13) is located on a ring jet arrangement (30).

2. The blower according to claim 1, wherein the mass current sensor (13) is an electronic air mass current anemometer.

3. the blower according to claim 1, wherein the ring jet arrangement (30) is located on the air inlet (28).

4. The blower according to claim 1, wherein the mass current sensor (13) is located in a bypass (31) which empties into a jet gap (32) of the ring jet arrangement (30).

5. The blower according to claim 4, wherein the ring jet arrangement (30) has a further jet gap (33) for the feeding in of fuel in addition to the jet gap (32) for the air mass measurement.

6. The blower according to claim 5, wherein a further mass current sensor (7) is located in the area of the further jet gap (33) which sends appropriate signals to the data processing device (4).

7. The device as defined in claim 3, wherein the ring jet arrangement (30) is an integral part of a housing wall (34) on the air inlet (28) of the blower wheel.

8. The device as defined in claim 3, wherein the ring jet arrangement (30) surrounds a main current of the combustion air on the air inlet (28).

9. The device as defined in claim 3, wherein the ring jet arrangement (30) is preceded by an input canal (35).

10. The device as defined in claim 9, wherein a bypass (31) empties into the input canal (35).

11. The device as defined in claim 9, wherein a bypass (31) empties into a ring gap (36) inside the input canal (35).

12. The device as defined in claim 1, wherein a valve (38) for a gas feed-in is an integral part of the housing.

13. The device as defined in claim 12, wherein the valve (38) for the gas feed-in is located on the suction side of the blower wheel.

14. The device as defined in claim 1, wherein an electronic motor commutation handles a mass current evaluation and regulates a speed of a blower motor.

15. The device as defined in claim 14, wherein the electronic motor commutation handles mass current evaluation and regulates a speed of a blower motor and the gas feed-in.

* * * * *

UNITED STATES PATENT AND TRADEMARK OFFICE
CERTIFICATE OF CORRECTION

PATENT NO. : 7,223,094 B2
APPLICATION NO. : 11/155350
DATED : May 29, 2007
INVENTOR(S) : Goebel Page 1 of 1

It is certified that error appears in the above-identified patent and that said Letters Patent is hereby corrected as shown below:

On the Title Page, Item [73], Assignee, Line 1, delete "Emb-Papst Landshut GmbH" and insert --ebm-papst Landshut GmbH--.

Signed and Sealed this

Second Day of October, 2007

JON W. DUDAS
*Director of the United States Patent and Trademark Office*